United States Patent
Nakae

(10) Patent No.: US 9,868,886 B2
(45) Date of Patent: Jan. 16, 2018

(54) ABRASIVE AGENT FOR SUBSTRATES AND SUBSTRATE MANUFACTURING METHOD

(71) Applicant: KONICA MINOLTA, INC., Chiyoda-ku (JP)

(72) Inventor: Hazuki Nakae, Kyoto (JP)

(73) Assignee: KONICA MINOLTA, INC., Tokyo (JP)

( * ) Notice: Subject to any disclaimer, the term of this patent is extended or adjusted under 35 U.S.C. 154(b) by 49 days.

(21) Appl. No.: 14/369,881

(22) PCT Filed: Dec. 14, 2012

(86) PCT No.: PCT/JP2012/008025
§ 371 (c)(1),
(2) Date: Jun. 30, 2014

(87) PCT Pub. No.: WO2013/099142
PCT Pub. Date: Jul. 4, 2013

(65) Prior Publication Data
US 2014/0357162 A1    Dec. 4, 2014

(30) Foreign Application Priority Data

Dec. 28, 2011    (JP) ................................ 2011-289538

(51) Int. Cl.
| | | |
|---|---|---|
| *C09K 3/14* | (2006.01) | |
| *G11B 5/84* | (2006.01) | |
| *B24B 37/00* | (2012.01) | |
| *C01F 17/00* | (2006.01) | |

(52) U.S. Cl.
CPC ............ *C09K 3/1463* (2013.01); *B24B 37/00* (2013.01); *C01F 17/0043* (2013.01); *C09K 3/1409* (2013.01); *G11B 5/84* (2013.01); *G11B 5/8404* (2013.01); *C01P 2004/62* (2013.01); *C01P 2006/80* (2013.01)

(58) Field of Classification Search
CPC .. B24B 37/00; C01F 17/0043; C01P 2004/62; C01P 2006/80; C09K 3/1409; C09K 3/1463; G11B 5/84; G11B 5/8404
See application file for complete search history.

(56) References Cited

U.S. PATENT DOCUMENTS

| | | | | |
|---|---|---|---|---|
| 5,766,279 | A  * | 6/1998 | Ueda ......................... | C09G 1/02 106/3 |
| 6,602,111 | B1 * | 8/2003 | Fujie ......................... | C09G 1/02 451/36 |
| 2004/0036149 | A1 * | 2/2004 | Takayasu .......... | H01L 21/31053 257/626 |
| 2004/0139764 | A1 * | 7/2004 | Komiya .............. | B24B 13/0018 65/61 |
| 2004/0211337 | A1 * | 10/2004 | Lee ........................... | C09G 1/02 428/693.1 |
| 2005/0026441 | A1 | 2/2005 | Takayasu | |
| 2006/0030243 | A1 * | 2/2006 | Nishimoto .......... | B24B 37/0056 451/41 |
| 2009/0158775 | A1 * | 6/2009 | Takizawa ................ | C03C 19/00 65/61 |
| 2010/0102268 | A1 * | 4/2010 | Kroell ...................... | C09G 1/02 252/79.1 |
| 2010/0307068 | A1 * | 12/2010 | Kroell ...................... | C09G 1/02 51/308 |
| 2011/0086241 | A1 * | 4/2011 | Hachitani ................ | C03C 3/083 428/846.9 |
| 2013/0136952 | A1 * | 5/2013 | Yukimatsu .......... | G11B 23/0028 428/848.2 |
| 2014/0094032 | A1 * | 4/2014 | Yoshida ............ | H01L 21/02024 438/693 |

FOREIGN PATENT DOCUMENTS

| | | |
|---|---|---|
| JP | 9-132770 | 5/1997 |
| JP | 10-106994 | 4/1998 |
| JP | 2001-089748 | 4/2001 |
| JP | 2004-79968 | 3/2004 |
| JP | 2004-219391 | 8/2004 |
| JP | 2005-500173 | 1/2005 |
| JP | 2010-519157 | 6/2010 |

\* cited by examiner

*Primary Examiner* — Marc Carlson
(74) *Attorney, Agent, or Firm* — Cozen O'Connor

(57) ABSTRACT

Provided is an abrasive agent for substrates that includes, as an abrasive material component in the abrasive agent, cerium oxide as the main component. The abrasive agent for substrates includes soluble silica and cerium oxide. The concentration ratio of the soluble silica, calculated as Si content, and the cerium oxide in the abrasive agent is 0.001:1 to 0.1:1.

2 Claims, No Drawings

ABRASIVE AGENT FOR SUBSTRATES AND SUBSTRATE MANUFACTURING METHOD

RELATED APPLICATIONS

This is a U.S. National stage of International application No. PCT/JP2012/008025 filed on Dec. 14, 2012.

This patent application claims the priority of Japanese application no. 2011-289538 filed Dec. 28, 2011, the disclosure content of which is hereby incorporated by reference.

TECHNICAL FIELD

The present invention relates to an abrasive agent for substrates and a substrate manufacturing method using same.

BACKGROUND ART

In magnetic information recording devices, information is recorded on an information recording medium by using magnetic, optical or photomagnetic effects. A hard disk drive (referred to hereinbelow as HDD) device is a typical example of such devices.

Contemporary HDD devices are required to have a high capacity and a reduced diameter, and there is a strong demand for reducing the floating amount of a magnetic head and decreasing the unit recording area with the object of increasing the recording density. At the same time, ever more stringent requirements are placed on surface quality, such as surface roughness and fine waviness, which is required after polishing in the process for manufacturing glass substrates for HDD. This all means that enhanced polishing quality that can be compatible with a reduced amount of head floating.

Patent Document 1 describes an abrasive agent including abrasive grains constituted by high-purity cerium oxide in which the content ratio of cerium oxide in the total content of rare earth oxides is equal to or greater than 95% by mass in order to stabilize the polishing quality of HDD glass substrates.

In the field of semiconductors, more stringent requirements are also placed on surface smoothness of semiconductor wafers in response to a dramatic increase in the degree of integration and increase in capacity in recent years, and more accurate polishing techniques are required. For example, Patent Document 2 describes using an abrasive agent for a semiconductor wafer that includes high-purity cerium oxide abrasive grains since cerium oxide particles have a comparatively low hardness and are unlikely to penetrate into the surface to be polished.

Patent Document 1: Japanese Patent Application Publication No. 2001-89748

Patent Document 2: Japanese Patent Application Publication No. H10-106994

SUMMARY OF THE INVENTION

An aspect of the present invention resides in an abrasive agent for substrates that includes, as an abrasive material component in the abrasive agent, cerium oxide as the main component, the abrasive agent for substrates including soluble silica and cerium oxide, and a concentration ratio (mass) of the soluble silica, calculated as Si content, and the cerium oxide in the abrasive agent being 0.001:1 to 0.1:1.

The present invention makes it possible to provide an abrasive agent for substrates and a substrate manufacturing method that enable high-speed flat polishing, thereby making it possible to obtain high-quality substrate with few fine scratches. The abrasive agent, as referred to in the present invention, means the entire abrasive material slurry including an abrasive material (can be also referred to as abrasive grains), which produces an abrasive action upon the substrate that is a polishing object, and a solvent (can be also referred to as abrasive liquid) which is a dispersion medium for the abrasive material.

DESCRIPTION OF EMBODIMENTS

In the prior art documents, the cerium oxide is used as the main component in the abrasive material components of the abrasive agents to improve machining characteristics. This is apparently because Si—O bonds on the glass surface are replaced by Ce—O bonds of the abrasive agent in the polishing process, thereby enhancing the polishing speed.

However, a problem associated with the conventional abrasive agents is in instability of polishing characteristics, in particular instability of polishing characteristics at the initial stage of use of the abrasive agent. More specifically, fine scratches and smooth wavelike undulations appear at the initial stage at which the use of the abrasive agent is started.

The reason therefor is that the spread in machining rate during polishing is very large at the initial stage of polishing, which results in the appearance of fine scratches and smooth wavelike undulations. Further, the examination of this spread in polishing characteristics demonstrates that the spread in polishing characteristics depends on the concentration of soluble silica present in the abrasive liquid.

As mentioned hereinabove, with the cerium oxide abrasive agents, the Ce—O bonds and Si—O bonds of glass replace each other, thereby enhancing the polishing, but it has been inferred that, as the polishing advances, the soluble silica elutes from the glass components of the material, which is being polished, into the abrasive liquid and encloses the periphery of cerium oxide. Such enclosure of cerium oxide with soluble silica is a feature inherent to cerium oxide abrasive agents, and because of a strong affinity between cerium oxide and Si—O bond system, a weak bond state is created by intermolecular forces in aqueous solutions.

In a state in which cerium oxide is completely enclosed by soluble silica, the replacement rate of Ce—O bonds and Si—O bonds in the material to be polished is constant. However, at the initial stage of polishing, before cerium oxide is entirely enclosed by soluble silica, the replacement rate changes in the enclosed portions and other portions due to the effect of steric hindrance or the like. The inventor has come to a conclusion that the instability of polishing characteristics at the initial stage of polishing is caused by this change in the replacement rate.

The present invention has been created with consideration for the problems of the related art, and it is an object of the present invention to provide an abrasive agent for substrates and a substrate manufacturing method that eliminate the instability of polishing characteristics at the initial stage of use of the abrasive agent, thereby making it possible to obtain high-quality substrates that have few fine scratches even at the initial stage of use of the abrasive agent.

Embodiments of the present invention are described below, but the present invention is not limited to those embodiments.

[Abrasive Agent for Substrates]

An abrasive agent for substrates according to the present embodiment includes, as an abrasive material component in the abrasive agent, cerium oxide as the main component, the abrasive agent for substrates including soluble silica and cerium oxide, and a concentration ratio of the soluble silica, calculated as Si content, and the cerium oxide in the abrasive agent being 0.001:1 to 0.1:1.

The abrasive materials and solvents that can be contained in the abrasive agent for substrates according to the present embodiment are explained below.

(Soluble Silica)

Soluble silica of the present embodiment is not particularly limited, provided that it is soluble in the solvent contained in the abrasive agent. Where silica is not dissolved in the solvent of the abrasive agent, the silica is present in a solid state in the solvent. As a result, the main surface of cerium oxide cannot be enclosed by silica and the polishing rate of cerium oxide cannot be stabilized. Further, where the undissolved silica is present in the abrasive agent, although it produces no direct effect on the polishing characteristics of cerium oxide, the undissolved silica comes into contact with the material to be polished and scratches the polished material thereby increasing the number of scratches.

$Si(OH)_4$ is a specific example of soluble silica, but the soluble silica of the present embodiment indicates soluble silica that can be measured by a molybdenum yellow method.

The concentration ratio of the soluble silica, calculated as Si content, and the cerium oxide in the abrasive agent is 0.001:1 to 0.1:1. Where this range is exceeded and the concentration ratio is high, the liquidity of the abrasive liquid changes significantly, thereby affecting the polishing ability. Further, where the concentration ratio is low, the cerium oxide cannot be enclosed and the problem of instability of polishing characteristics cannot be resolved. Further, it is more preferred that the concentration ratio be 0.01:1 to 0.05:1.

The content of soluble silica (calculated as Si content) in the present embodiment is determined in the following manner.

An ammonium molybdate solution is added to a sample (abrasive agent) for measuring the concentration, and pH is then adjusted to about 1.2 to 1.5 with sulfuric acid or nitric acid. The system is then allowed to stay for several minutes, a light absorbance at 410 nm to 450 nm is then measured, and the concentration (% by mass) of Si in the sample is determined from a calibration curve that has been plotted in advance.

Where a substrate is polished using the abrasive agent including the soluble silica, it is possible to obtain a high-quality substrate with a small number of scratches from the initial stage of the polishing process.

(Cerium Oxide)

The cerium oxide used in the present embodiment is not particularly limited, provided it is of a type that is usually used in abrasive agents. The cerium oxide can be obtained by oxidizing a cerium compound such as a carbonate, a nitrate, a sulfate, or an oxalate. An oxidation method using calcination or hydrogen peroxide can be used for the oxidation. In the case of calcination, the calcination temperature is preferably 350° C. to 900° C.

Further, a hydrothermal synthesis method can be also used for producing cerium oxide. For example, a method can be used by which a precursor such as cerium hydroxide is heated in water to a temperature equal to or higher than 100° C.

The content of cerium oxide is preferably 1% by mass to 10% by mass, more preferably 3% by mass to 5% by mass, with respect to the total amount of the abrasive agent for substrates. Where the content of cerium oxide is less than 1% by mass, polishing does not proceed or the polished substrate has a poor shape, and where the content exceeds 10% by mass, the polishing effect does not change, but the cost rises.

The average particle diameter ($D_{50}$) of the cerium oxide is preferably 0.5 μm to 1.5 μm, more preferably 0.7 μm to 1.2 μm. Where the average particle diameter ($D_{50}$) of cerium oxide is less than 0.5 μm, the polishing rate decreases, and where the average particle diameter is above 1.5 μm, the number of scratches can increase.

The average particle diameter ($D_{50}$), as referred to herein, means a particle diameter corresponding to 50% ($D_{50}$), as a cumulative volume fraction, according to JIS R 1629-1997 "Determination of particle size distributions for fine ceramic raw powders by laser diffraction method", and is usually used to represent the average diameter of ultrafine metal particles.

Commercial cerium oxide can be also used as the cerium oxide of the present embodiment. For example, cerium oxide marketed by Nanophase Technologies Corporation, Ferro Corporation, Advanced Nano Products Co., Ltd, Rhodia Electronics and Catalysis Inc., and C. I. KASEI CO., LTD. can be used.

The content of alkali metals and halogens in the abrasive agent including cerium oxide is preferably equal to or less than 10 ppm in the cerium oxide. A high polishing rate can be obtained with this range.

(Other Abrasive Materials)

In addition to the cerium oxide, the abrasive agent for glass of the present embodiment may also include carbides, nitrides, oxides, and borides of metals or semimetals and also diamond as abrasive materials. Metals and semimetals belong to Groups 2A, 2B, 3A, 3B, 4A, 4B, 5A, 6A, 7A, and 8A in the long-period periodic table. Specific examples of such abrasive materials include α-alumina, intermediate alumina, alumina sol, silicon carbide, magnesium oxide, zinc oxide, zirconium oxide, colloidal silica, and fumed silica. Those abrasive materials may be used individually or, as necessary, in combinations of two or more thereof.

When the abrasive agent of the present embodiment includes the soluble silica and an abrasive material other than cerium oxide, the content thereof is preferably 0.1% by mass to 1% by mass, more preferably 0.2% by mass to 0.5% by mass based on the total weight of the abrasive agent for substrate. Where the content of cerium oxide is less than 0.1% by mass, the polishing rate tends to decrease, and when the content of cerium oxide is more than 1% by mass, scratches can appear on the substrate surface.

(Acid)

The abrasive agent of the present embodiment may additionally contain an acid, and both inorganic acids and organic acids can be used therein. Examples of suitable inorganic acids include nitric acid, nitrous acid, sulfuric acid, sulfurous acid, amidosulfuric acid, phosphoric acid, polyphosphoric acid, and phosphonic acid. Examples organic acids include glycolic acid, oxalic acid, succinic acid, maleic acid, fumaric acid, itaconic acid, malic acid, tartaric acid, citric acid, phosphonohydroxyacetic acid, hydroxyethylidene-1,1-diphosphonic acid, phosphonobutanetricarboxylic acid, and ethylenediamine tetramethylenephosphonic acid. Among them, from the standpoint of further increasing the polishing rate and further reducing the waviness, sulfuric acid, phosphoric acid, polyphosphoric acid, itaconic acid, and citric acid are preferred. Those acids may be used individually or in mixtures of two or more thereof. It is further preferred that those acids be present in the abrasive agent in the form of a partially or fully neutralized salt.

When an acid is included in the abrasive agent of the present embodiment, the content thereof is preferably at most 0.01% by mass to 0.1% by mass, more preferably 0.02% by mass to 0.05% by mass with respect to the total amount of the abrasive agent for substrates in order to further increase the polishing rate. With the content of acid in this range, the corrosion of the polishing apparatus can be inhibited.

(Oxidizing Agent)

The abrasive agent of the present embodiment may further include an oxidizing agent. Examples of suitable oxidizing agents include peroxides, peroxo acids of metals and salts thereof, and oxo acids and salts thereof. Based on the structure thereof, the oxidizing agents can be generally classified into inorganic oxidizing agents and organic oxidizing agents. From the standpoint of further increasing the polishing rate, availability, and handleability, such as solubility in water, inorganic oxidizing agents are preferred. Specific examples of the inorganic oxidizing agents include hydrogen peroxide, peroxides of alkali metals or alkaline earth metals, peroxocarbonates, peroxosulfuric acid and salts thereof, peroxophosphoric acid and salts thereof, peroxoborates, peroxochromates, permanganates, and halogen-including oxo acid salts and metal salt of inorganic acids. Those oxidizing agents may be used individually or in mixtures of two or more thereof.

When the oxidizing agent is included in the abrasive agent of the present embodiment the content thereof is preferably at most 0.01% by mass to 0.1% by mass, more preferably 0.02% by mass to 0.05% by mass with respect to the total amount of the abrasive agent for substrates to enable additional increase in polishing rate. Where this content is less than 0.01% by mass, the polishing rate tends to decrease, and where the content is above 0.1% by mass, quality of the obtained substrate surface can be degraded.

(Solvent)

For example, water can be used as the solvent to be used in the abrasive agent for substrates of the present embodiment. Distilled water, ion exchange water, pure water, and ultrapure water can be used as the water. The content of the solvent in the abrasive agent for substrate of the present embodiment is preferably equal to or higher than 55% by mass, preferably equal to or higher than 75% by mass in order to further facilitate the handling of the abrasive agent for substrates.

The pH of the abrasive agent for substrates of the present embodiment can be determined, as appropriate, according to the material of the substrate to be polished, but is preferably 1 to 12, more preferably 6 to 10. Within this range, cleaning of the substrate to be polished is further facilitated, the machining tools are further prevented from corrosion, and the operator can perform safer operations.

The abrasive agent for substrates of the present embodiment can further include a bactericidal agent, an antimicrobial agent, a thickening agent, a dispersant, a preservative, a basic substance, and a pH adjusting agent.

The abrasive agent for substrates of the present embodiment can be used in a variety of polishing steps in a substrate manufacturing method, but is particularly suitable for use in a coarse polishing step in the substrate manufacturing method.

(Method for Preparing the Abrasive Agent for Substrates)

The abrasive agent for substrates of the present embodiment can be prepared, for example, by mixing an abrasive material with a solvent to obtain an abrasive slurry, adding a solution prepared by dissolving soluble silica in a solvent to the abrasive slurry, and stirring. The stirring of the abrasive agent is not particularly limited and can be performed using a stirring device such as a homomixer, a homogenizer, an ultrasound dispersing device, and a wet ball mill.

The pH of the abrasive agent for substrates may be adjusted to a predetermined pH value after the components have been mixed or prior to mixing. The pH adjustment can be performed with a pH adjusting agent.

[Substrate Manufacturing Method]

The substrate manufacturing method according to the present embodiment is a manufacturing method having a step for polishing a substrate by using the abrasive agent for substrates. With the substrate manufacturing method of the present embodiment, because the polishing step using the abrasive agent for substrates of the present embodiment is included, it is possible to manufacture a high-quality substrate with a small number of scratches even at the initial stage of use of the abrasive agent.

The specific feature of the substrate manufacturing method of the present embodiment is that a step for polishing the substrate, which is to be polished, by using the abrasive agent for substrates is included, and other conditions and steps of the manufacturing method are not particularly limited. A method for manufacturing a glass substrate for a HDD is one mode of the substrate manufacturing method of the present embodiment.

It is preferred that the method for manufacturing a glass substrate for a HDD include, as a pretreatment for the polishing step, for example, a disk machining step, a grinding step, an outer circumferential end surface polishing step, an inner circumferential end surface polishing step, and a chemical strengthening step.

The polishing step of the present embodiment can be performed by supplying the abrasive agent for substrates of the present embodiment to the polishing surface of the substrate to be polished, bringing a polishing pad into contact with the polishing surface, and moving the polishing pad or the substrate to be polished, while applying a predetermined pressure (load). The polishing can be performed with the conventional well-known polishing apparatus.

The abrasive agent for substrates may be used as is, or may be diluted if it is a concentrated liquid. Where the concentrated liquid is diluted, the dilution ratio is not particularly limited and can be determined, as appropriate, according to the concentration of each component in the concentrated liquid (content of the abrasive material) or polishing conditions.

The polishing pad is not particularly limited, and the conventional well-known pad can be used. An organic polymer can be used as the material of the polishing pad, and polyurethane can be used as the organic polymer. The polishing pad is preferably in the form of nonwoven fabric.

The polishing load means a surface plate pressure applied to the polishing surface of the substrate to be polished during polishing. The polishing load in the manufacturing method of the present embodiment is preferably 3 kPa to 50 kPa, more preferably 5 kPa to 40 kPa to further suppress the appearance of fine scratches on the substrate.

The supply rate of the abrasive agent for substrates is preferably at most 0.01 mL/min to 0.25 mL/min per 1 $cm^2$ of the substrate to be polished, more preferably at most 0.025 mL/min to 0.2 mL/min per 1 cm² of the substrate to be polished. Within this range, the polishing can be performed at a low cost, and the polishing rate can be further increased.

The substrate to be polished is not particularly limited, but a substrate for a recording disk to be used as a recording medium, for example, a substrate for manufacturing a glass substrate for a HDD, is preferred.

The abrasive agent for substrates of the present embodiment can reduce the appearance of fine scratches even when it is used for polishing semiconductor substrates. Therefore, the present embodiment relates, in one aspect thereof, to a method for polishing a semiconductor substrate. For example, a silicon wafer can be used as the semiconductor substrate. Substrates from element semiconductors such as Si or Ge, compound semiconductors such as GaAs, InP, or CdS, and mix crystal semiconductors such as InGaAs and HgCdTe can be also used.

The abrasive agent for substrates of the present embodiment can be also used for a polishing step in a semiconductor device manufacturing process. Chemical-mechanical polishing (CMP) is an example of the polishing step. Therefore, in another aspect thereof, the present embodiment relates to a semiconductor device manufacturing method. The semiconductor device manufacturing method can include a thin film formation step for forming a thin film on one main surface side of a semiconductor substrate, an uneven surface formation step for forming an uneven pattern on the thin film surface opposite that on the semiconductor substrate side, and a polishing step for polishing the uneven surface by using the abrasive agent for substrates of the present embodiment. The thin film formation step may be implemented a plurality of times, as necessary.

Examples of the thin film formed in the thin film formation step include an insulating layer and a conductive layer such as a metal layer and a semiconductor layer. Examples of materials that can be included in the insulating layer include silicon oxide, silicon nitride, and polysilicon. The conventional well-known lithography method can be used for forming the uneven surface. In the lithography method, the steps of coating a photoresist, exposing, developing, etching and removing the photoresist are performed in the order of description.

The present description discloses a variety of modes such as described hereinabove, and the main technical features thereamong are summarized below.

An abrasive agent for substrates according to an aspect of the present invention is an abrasive agent for substrates that includes, as an abrasive material component in the abrasive agent, cerium oxide as the main component, the abrasive agent for substrates including soluble silica and cerium oxide, and a concentration ratio (mass) of the soluble silica, calculated as Si content, and the cerium oxide in the abrasive agent being 0.001:1 to 0.1:1.

With such a configuration, polishing characteristics can be stabilized even at the initial stage of polishing. As a result, the appearance of fine scratches and waviness in the obtained substrate can be suppressed.

In the abrasive agent for substrates, the content of the cerium oxide is preferably 1% by mass to 10% by mass with respect to the total amount of the abrasive agent for substrates.

With such a feature, the appearance of fine scratches and waviness in the obtained substrate can be suppressed more reliably.

Further, in the abrasive agent for substrates, the concentration ratio of the soluble silica, calculated as Si content, and the cerium oxide in the abrasive agent is preferably 0.01:1 to 0.05:1.

With such a feature, a more stable polishing characteristic can be obtained.

Another aspect of the present invention resides in a substrate manufacturing method including a step for polishing a substrate by using the abrasive agent for substrates.

With such a configuration, in the substrate manufacturing method, the substrate can be polished while reducing the number of fine scratches at the initial stage of polishing.

The substrate is preferably a glass substrate for a HDD.

With such a configuration, a high-quality glass substrate for a HDD can be obtained with few fine scratches.

EXAMPLES

The present invention will be explained below in greater details with reference to examples thereof, but the present invention is not limited to those examples.

Example 1

[Preparation of Abrasive Agent]

Initially, a soluble silica solution with a concentration of 1% by mass was prepared by dissolving glass (includes 33% by mass of Si) in 5N aqueous solution of sodium hydroxide, and then neutralizing with nitric acid.

Then, 10 kg of cerium oxide (average particle diameter ($D_{50}$) 1.0 μm) and about 90 kg water were stirred by using a three-one motor (produced by Shinto Scientific Co., Ltd.) so as to obtain the content of cerium oxide of 10% by mass with respect to the total amount of the polishing material, and an abrasive slurry was prepared. The soluble silica solution prepared by the previous stage was then added to the abrasive slurry so as to obtain a concentration ratio of soluble silica, calculated as Si amount, and cerium oxide in the abrasive agent of 0.001:1, and stirring was performed in the same manner as before to obtain an abrasive agent 1.

The amount of soluble silica solution, calculated as Si, was determined by the above-described method.

[Substrates to be Polished]

Glass substrates manufactured by the below-described steps were prepared.

(Disk Machining Step)

A glass raw material 1 (composition is shown in Table 1) was used, the molten glass raw material was press molded, and a disk-shaped blank with an outer diameter of about 66 mm was produced. The blank thickness was 1.05 mm.

TABLE 1

| | |
|---|---|
| $SiO_2$ | 66 wt % |
| $Al_2O_3$ | 15 wt % |
| $Li_2O$ | 7 wt % |
| $Na_2O$ | 9 wt % |
| $K_2O$ | 0.5 wt % |
| CaO | 2.5 wt % |

(Disk Machining Step)

A round hole (central hole) with a diameter of 20.5 mm was opened in the central portion of the blank by using a core drill equipped with a cylindrical diamond abrasive stone. A barrel-shaped diamond abrasive stone was then used to perform inner and outer diameter machining of the outer circumferential end surface and inner circumferential end surface of the blank to an outer diameter of 65 mm and an inner diameter of 20 mm. The outer circumferential end surface and inner circumferential end surface of the glass blank after the disk machining step was ground with an inner-outer circumference machining tool (TKV-1, manufactured by Tateno Machinery Co., Ltd.).

(Inner Circumferential End Surface Polishing Step)

The inner circumferential end surface of the glass substrate was then polished using an end surface polishing tool.

(Grinding Step)

The main surface of the glass substrate after the inner circumferential end surface polishing step was then ground with an allowance of 35 μm by using a two-side grinding tool so as to obtain a flatness of 10 μm on the main surface. The two surfaces of the glass substrate were then ground again and the main surface was ground with an allowance of 50 μm to obtain a glass substrate flatness of 3 μm.

(Outer Circumferential End Surface Polishing Step)

The outer circumferential end surface of the glass substrate was then polished using an end surface polishing tool (BRK-02, manufactured by Tateno Machinery Co., Ltd.).

(Chemical Strengthening Step)

A strengthening salt prepared by mixing sodium nitrate 54% and potassium nitrate 46% was melted at 480° C., and the glass substrate after the outer circumferential end surface polishing was immersed therein for 4 hours.

[Polishing Method]

The glass substrates obtained through the steps were polished under the following polishing conditions by using the abrasive agent 1. The allowance was 20 μm.

(Polishing Conditions)

Polishing tool: two-side polishing tool (manufactured by HAMAI CO., LTD.)

Polishing pad: thickness 0.8 mm, average pore diameter 30 μm

Disk revolution speed: 20 rpm

Polishing load: 10 kPa

Abrasive agent supply rate: 5000 mL/min

Number of polished glass substrates: 100

(Determination of Scratches)

The glass substrate 1 obtained in the polishing step was immersed in 20 ml of ultrapure water (20° C.) at 18 MΩ·cm or higher and cleaned by allowing to stay in the water for 10 min. The cleaned glass substrate was then dried and the number of scratches on the dried glass substrate was measured with an optical surface analyzer (OSA) Candela 7120 (KLA-tencol Corporation)

The evaluation criteria were as follows:

Very good: the number of scratches is less than 1 scratch/cm$^2$;

Good: the number of scratches is equal to or greater than 1 scratch/cm$^2$ and less than 10 scratch/cm$^2$; and Poor: the number of scratches is equal to or greater than 10 scratch/cm$^2$.

Examples 2 to 4; Comparative Examples 1 and 2

In Examples 2 to 4, abrasive agents 2 to 4 were prepared in the same manner as in Example 1, except that the concentration ratio of soluble silica, calculated as Si amount, and cerium oxide was adjusted as shown in Table 2. In Comparative Example 1, an abrasive agent 5 was prepared in the same manner as in Example 1, except that the soluble silica solution of Example 1 was not added. In Comparative Example 2, an abrasive agent 6 was prepared in the same manner as in Example 1, except that the concentration ratio of soluble silica, calculated as Si amount, and cerium oxide was adjusted to 0.0001:1.

Glass substrates were polished and scratches in the glass substrates after polishing were evaluated in the same manner as in Example 1, except that the abrasive agents of Examples 2 to 4 and Comparative Examples 1 and 2 were used.

The results obtained in Examples 1 to 4 and Comparative Examples 1 and 2 are shown in Table 2 below.

TABLE 2

|  | Abrasive agent | Concentration ratio of soluble silica, calculated as Si amount, and cerium oxide | Evaluation of scratches |
| --- | --- | --- | --- |
| Example 1 | Abrasive agent 1 | 0.001:1 | Good |
| Example 2 | Abrasive agent 2 | 0.1:1 | Good |
| Example 3 | Abrasive agent 3 | 0.01:1 | Very good |
| Example 4 | Abrasive agent 4 | 0.05:1 | Very good |
| Comparative Example 1 | Abrasive agent 5 | — | Poor |
| Comparative Example 2 | Abrasive agent 6 | 0.0001:1 | Poor |

As shown in Table 2, in the abrasive agents of Examples 1 to 4, soluble silica apparently surrounded cerium oxide. Therefore, polishing using such abrasive agents could produce glass substrates with few scratches. In particular, in Examples 3 and 4, practically no scratches were observed on the glass substrate since the concentration ratio of soluble silica, calculated as Si amount, to cerium oxide was within a range of 0.01:1 to 0.05:1.

On the other hand, the glass substrates polished using the abrasive agent 5 of Comparative Example 1, which included absolutely no soluble silica, were polished with the abrasive agent including cerium oxide as the main component at the initial stage of polishing. As a result a large number of scratches were observed. Further, in the glass substrate polished with the abrasive agent 6, in which the concentration ratio of soluble silica, calculated as Si amount, and cerium oxide was adjusted to 0.0001:1, scratches appeared on the substrate and the substrate quality was degraded. This is because the soluble silica could not sufficiently enclose cerium oxide and therefore the polishing characteristic was instable.

Example 5

In Example 5, the polishing step was implemented by using the abrasive agent 3 and the polishing method same as those of Example 3, except that an aluminum alloy substrate plated with Ni—P was used as a substrate for a semiconductor wafer.

As a result, practically no scratches were observed on the aluminum alloy substrate after the polishing step, and a high-quality substrate with high flatness was obtained.

This application is based on Japanese Patent Application No. 2011-289538 filed on Dec. 28, 2011, and the contents thereof are incorporated in the present application.

The present invention has been adequately and sufficiently explained hereinabove on the basis of embodiments thereof with reference to the appended drawings in order to describe the present invention, but it should be recognized that the embodiments could be easily changed and/or modified by a person skilled in the art. Therefore, changes or modifications implemented by a person skilled in the art should be construed to be included in the scope of rights delineated in the claims, provided that the changes or modifications do not depart from the scope of rights delineated in the claims.

INDUSTRIAL APPLICABILITY

The present invention has broad industrial applicability in the technical field of abrasive agents for substrates and substrates.

The invention claimed is:

1. An abrasive agent for substrates comprising:
an abrasive slurry and a soluble silica,
wherein the abrasive slurry comprises cerium oxide as a main abrasive material component in the abrasive agent,
wherein the soluble silica is dissolved in a solvent, wherein;
a concentration ratio (mass) between the soluble silica in the abrasive agent, and the cerium oxide in the abrasive agent being 0.001:1 to 0.1:1,
the average particle diameter ($D_{50}$) of the cerium oxide is 0.5 μm to 1.5 μm, and
the content of the cerium oxide is 1% by mass to 10% by mass with respect to the total amount of the abrasive agent for substrates.

2. The abrasive agent for substrates according to claim 1, wherein the concentration ratio (mass) between the soluble silica in the abrasive agent, and the cerium oxide in the abrasive agent is 0.01:1 to 0.05:1.

* * * * *